United States Patent

Oda

[19]

[11] Patent Number: 5,857,111
[45] Date of Patent: Jan. 5, 1999

[54] RETURN ADDRESS ADDING MECHANISM FOR USE IN PARALLEL PROCESSING SYSTEM

[75] Inventor: Minoru Oda, Yamanashi, Japan

[73] Assignee: NEC Corporation, Tokyo, Japan

[21] Appl. No.: 937,890

[22] Filed: Feb. 12, 1996

Related U.S. Application Data

[63] Continuation of Ser. No. 291,705, Aug. 16, 1994, abandoned.

[30] Foreign Application Priority Data

Aug. 19, 1993 [JP] Japan .................................. 5-204812

[51] Int. Cl.$^6$ ..................................................... G06F 13/00
[52] U.S. Cl. ...................................... 395/800.11; 395/312
[58] Field of Search ................................ 395/312, 311, 395/800.02, 800.1, 800.11

[56] References Cited

U.S. PATENT DOCUMENTS

| | | | |
|---|---|---|---|
| 4,760,518 | 7/1988 | Potash et al. ........................... | 364/200 |
| 4,760,525 | 7/1988 | Webb ...................................... | 364/200 |
| 5,179,669 | 1/1993 | Peters ..................................... | 395/312 |
| 5,197,130 | 3/1993 | Chen et al. ............................. | 395/325 |
| 5,321,813 | 6/1994 | McMillen et al. ...................... | 395/200 |
| 5,754,792 | 5/1998 | Shutoh et al. ..................... | 395/200.73 |

FOREIGN PATENT DOCUMENTS

91/10183  7/1991  WIPO .

Primary Examiner—Glenn A. Auve
Attorney, Agent, or Firm—Foley & Lardner

[57] ABSTRACT

When memory access is to be accomplished in a parallel processing system, interfacing between networks is simplified by generating network control information for the return of read out data in the networks and embedding it into requests. For this purpose, flip-flops for identifying input port numbers are provided in each network through which requests are to be transferred, the identified input numbers are embedded into the requests to be transferred and, when returning data, this information is used as network switching control information. Furthermore, the outputs of arbiters in the networks through which requests are transferred are used as input port numbers.

6 Claims, 8 Drawing Sheets

RETURN ADDRESS ADDING MECHANISM FOR USE IN PARALLEL PROCESSING SYSTEM

This application is a continuation of application Ser. No. 08/291,705, filed Aug. 16, 1994 now abandoned.

BACKGROUND OF THE INVENTION

1. Field of the Invention

The present invention relates to a parallel processing system having a plurality of arithmetic processing units, and, more particularly, to a parallel processing system in which each of plural arithmetic processing units is linked to storage units by networks.

2. Description of the Prior Art

Examples of such a system according to the prior art include a parallel processing system using crossbar switches for switching inputs to outputs according to destination addresses, described in the Gazette of PCT Patent No. WO 91/10183. In such a parallel processing system according to the prior art, every destination address is generated in advance when each packet is to be routed.

Figure 1:
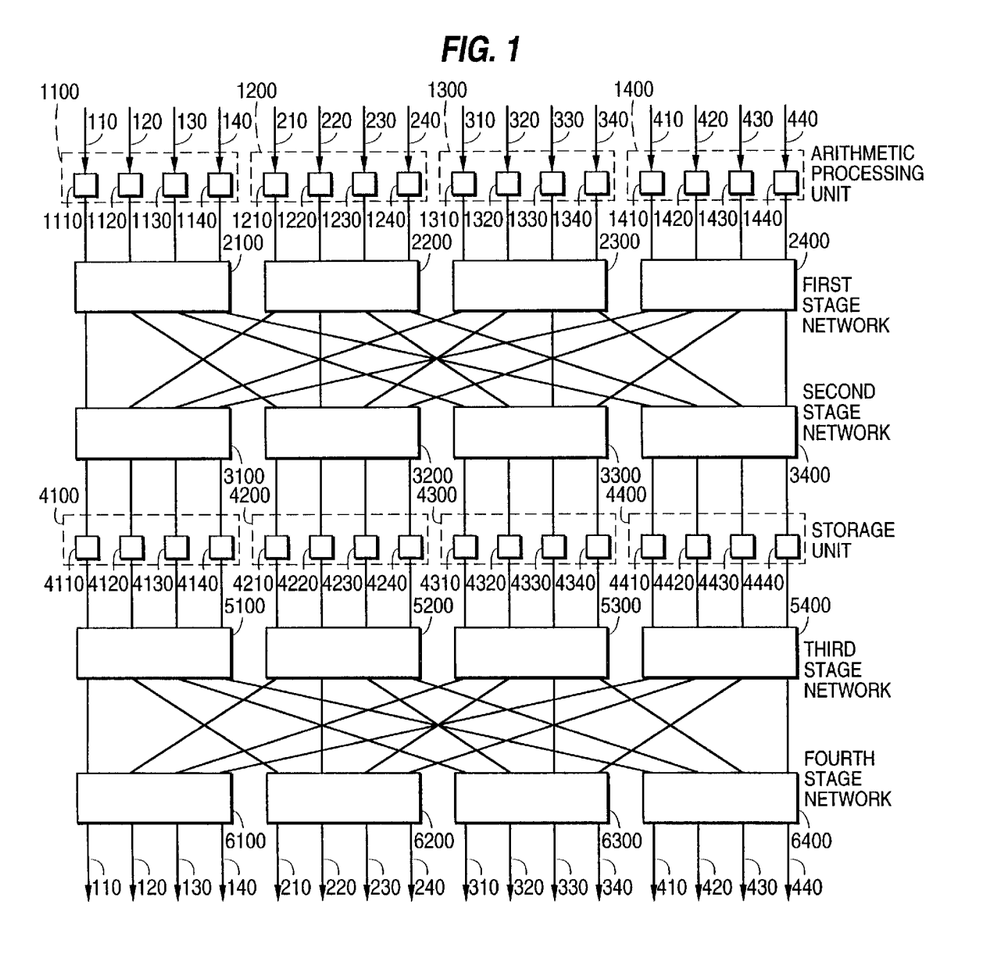
FIG. 1 illustrates the configuration of a parallel processing system according to the invention.

A parallel processing system to which the present invention is applicable, as illustrated in FIG. 1, has a configuration in which a plurality of arithmetic processing units 1100 to 1400 are linked to a plurality of storage units 4100 to 4400 by networks 2100 to 2400 and 3100 to 3400 or 5100 to 5400 and 6100 to 6400. Here, each arithmetic processing unit is supposed to have a plurality of vector processors, and each storage unit is supposed to have a plurality of memory modules.

A memory access request issued from a vector processor in an arithmetic processing unit is transferred by a first stage network and a second stage network to a memory module in a designated storage unit. If the access request is the read-out from the memory, the read data are transferred by a third stage network and a fourth stage network to the requesting vector processor.

Figure 8:
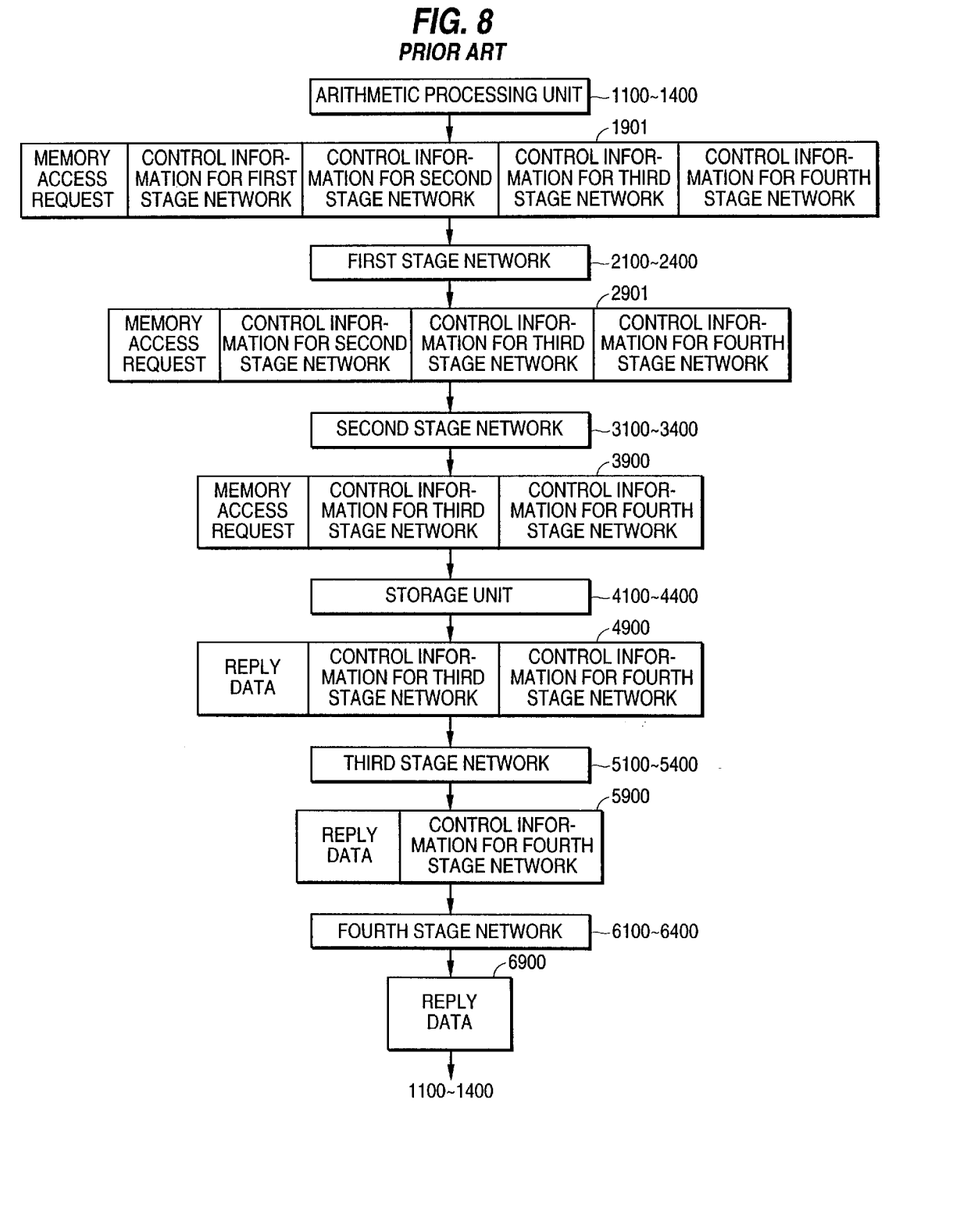
FIG. 8 shows a packet configuration in a parallel processing system according to the prior art.

Referring to FIG. 8, according to the prior art, the format of a packet 1901 to be sent from the arithmetic processing units 1100 to 1400 to the first stage networks includes a field indicating that the packet concerns a memory access request, such as to read out from the memory, and control information for use at each stage of networks. Thus, the packet 1901 of the prior art includes control information for each of the first stage networks 2100 to 2400, the second stage networks 3100 to 3400, the third stage networks 5100 to 5400 and the fourth stage networks 6100 to 6400 as network control information. Incidentally, other fields including the write data field and the address in the memory module are omitted for the convenience of illustration.

The format of a packet 2901 to be sent from the first stage networks 2100 to 2400 to the second stage networks 3100 to 3400 has the same fields as the packet 1901 except that it does not include control information for the first stage networks 2100 to 2400 as network control information.

Further, the format of a packet 3900 to be sent from the second stage networks 3100 to 3400 to the storage units 4100 to 4400 has the same format as the packet 2901 except that it does not include control information for the second stage networks 3100 to 3400 as network control information.

After the storage units 4100 to 4400 receive the memory access request, the storage units 4100 to 4400 will write data in the write data field into the prescribed address in the memory module if it is a request to write into the memory. On the other hand, if the requested access is the read-out from the memory, they will return the read data to the arithmetic processing unit as reply data. A packet 4900 to the third stage networks 5100 to 5400 for this read data return includes control information for each of the third stage networks 5100 to 5400 and the fourth stage networks 6100 to 6400 as network control information. Further, a packet 5900 to be sent from the third stage networks 5100 to 5400 to the fourth stage networks 6100 to 6400 includes control information for the fourth stage networks 6100 to 6400 as network control information.

Then, the fourth stage networks return the reply data to the vector processor which issued the memory read request.

Thus in the parallel processing system according to the prior art, all the network control information for use when reply data are to be returned from the storage unit, i.e. the data returning side, is generated by the vector processor unit, i.e. on the request issuing side. Furthermore, as the prior art involves the sending of network control information added to packets, there is the problem that interfacing between the networks is expanded and the number of flip-flops for holding control information increased, resulting in greater complexity of network control.

SUMMARY OF THE INVENTION

An object of the present invention, therefore, is to solve the aforementioned problems and to simplify interfacing between networks.

Another object of the invention is to avoid the generation of unnecessary network control information on the request issuing side and thereby to reduce the load on the request issuing side.

In one of its preferred embodiments, the invention provides a parallel processing system comprising:

a storage unit having a plurality of memory modules;

a plurality of arithmetic processing units for issuing read requests to said storage unit;

first data switching units for supplying in parallel the read requests from said plurality of arithmetic processing units to any of said memory modules in said storage unit; and second data switching units for supplying in parallel data read out from said storage unit to any of said arithmetic processing units, wherein said first data switching units add to said read requests the output routes in said second data switching units.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Preferred embodiments of the present invention will be described in detail below with reference to drawings.

Referring to FIG. 1, in a first preferred embodiment of the invention, arithmetic processing units 1100 to 1400 are parts for performing arithmetic processing and memory accessing, and here each has four vector processors. The vector processors 1110 to 1440 carry out processing in accordance with the contents of the program. Each of storage units 4100 to 4400 has four out of memory modules 4110 to 4440. These memory modules in the storage units are read and written via networks.

First stage networks 2100 to 2400 and second stage networks 3100 to 3400 perform transfer control to access the storage unit which is the destination of a command from an arithmetic processing unit. On the other hand, third stage networks 5100 to 5400 and fourth stage networks 6100 to 6400 perform transfer control, when the memory is to read out data, to return the read out data to the requesting arithmetic processing unit.

Incidentally, although each of the four arithmetic processing units in FIG. 1 has four vector processors, they may have any other desired configuration. If they have some other configuration, the configuration of each network will also change, but there will be no change in underlying principle.

Figure 2:
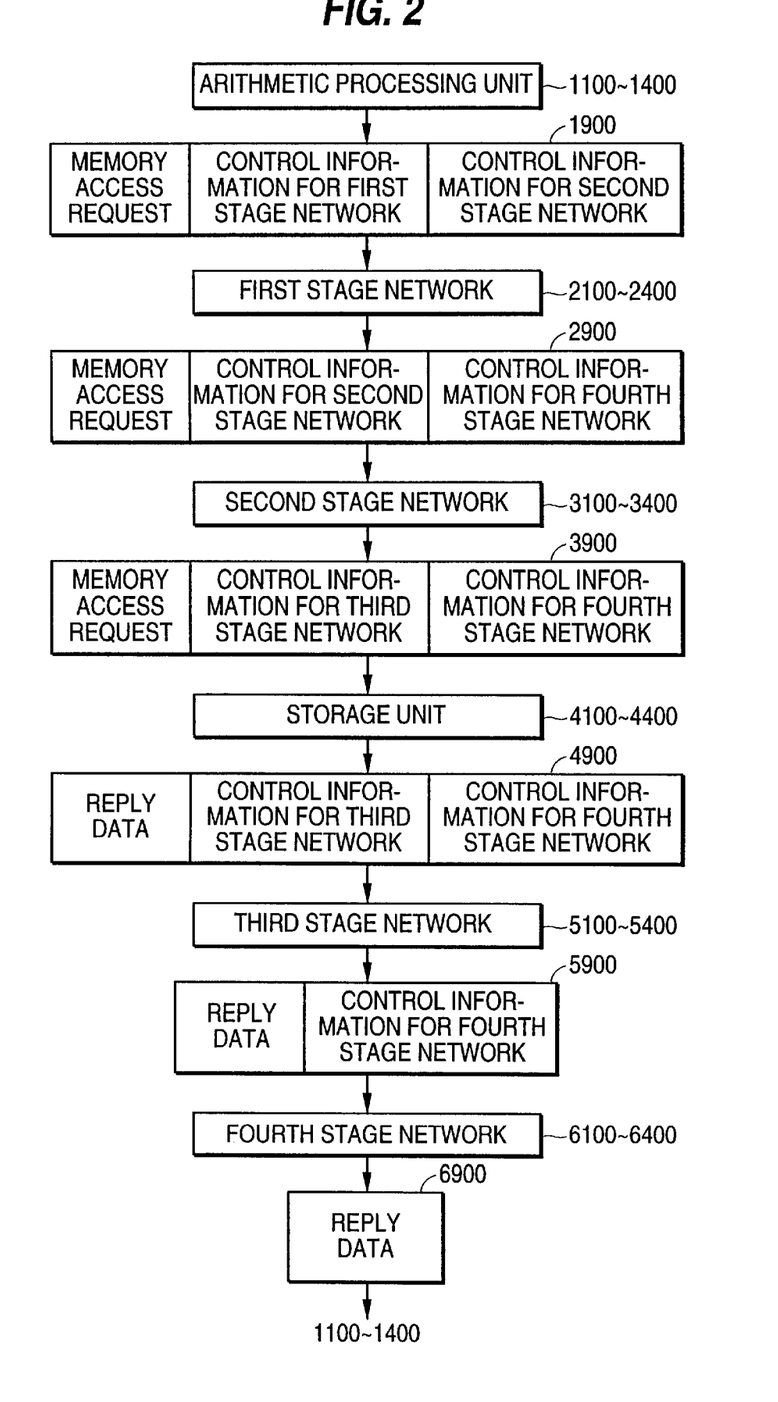
FIG. 2 illustrates a typical configuration of a packet according to the invention.

Referring now to FIG. 2, in this preferred embodiment of the invention, the format of a packet 1900 to be sent from the arithmetic processing units 1100 to 1400 to the first stage networks includes a field indicating that the packet concerns a memory access request, such as the read-out from the memory, and control information for use at each stage of networks. Thus, the packet 1900 in this embodiment of the invention includes control information for each of the first stage networks 2100 to 2400 and the second stage networks 3100 to 3400. Incidentally, other fields including the write data field and the address in the memory module are omitted for the convenience of illustration.

The format of a packet 2900 to be sent from the first stage networks 2100 to 2400 to the second stage networks 3100 to 3400 includes control information for each of the second stage networks 3100 to 3400 and the fourth stage networks 6100 to 6400 as network control information. Here the control information for the fourth stage networks 6100 to 6400 is not included in the packet 1900, but was given by the first stage networks.

Further, the format of a packet 3900 to be sent from the second stage networks 3100 to 3400 to the storage units 4100 to 4400 includes control information for the third stage networks 5100 to 5400 and the fourth stage networks 6100 to 6400 as network control information. Here the control information for the third stage networks 5100 to 5400 is not included in the packet 2900, but was given by the second stage networks.

After the storage units 4100 to 4400 receives the memory access request, the storage units 4100 to 4400 will write data in the write data field into the prescribed address in the memory module if it is a request to write into the memory. On the other hand, if the requested access is the read-out from the memory, they will return the read data to the arithmetic processing unit as reply data. A packet 4900 to the third stage networks 5100 to 5400 for this read data return includes control information for each of the third stage networks 5100 to 5400 and the fourth stage networks 6100 to 6400 as network control information. Further, a packet 5900 to be sent from the third stage networks 5100 to 5400 to the fourth stage networks 6100 to 6400 includes control information for the fourth stage networks 6100 to 6400 as network control information.

Then, the fourth stage networks return the reply data to the vector processor which issued the memory read request.

Figure 3:
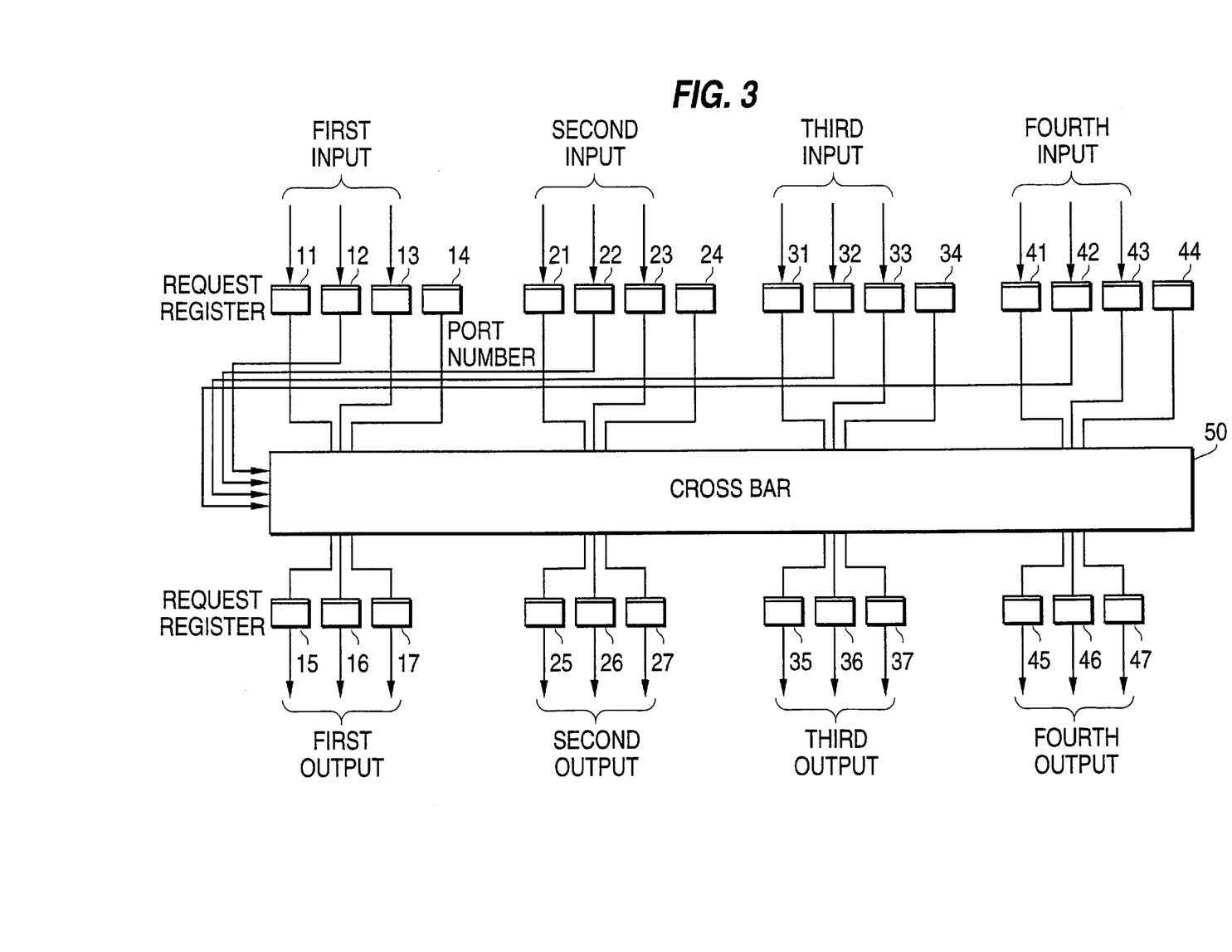
FIG. 3 is a block diagram of a first stage network in a first preferred embodiment of the invention.

Referring to FIG. 3, each of the first stage and second stage networks in the first preferred embodiment of the present invention has four sets of input ports and four sets of output ports, constituting a 4×4 network through a crossbar 50. On the input port side, there are provided request registers 11, 21, 31 and 41 for holding memory access requests and the like, network control information registers 12, 13, 22, 23, 32, 33, 42 and 43, and port number registers 14, 24, 34 and 44. On the output port side, there are provided request registers 15, 25, 35 and 45 for holding memory access requests and the like, and network control information registers 16, 17, 26, 27, 36, 37, 46 and 47.

The crossbar 50 switches in parallel input data given to the four sets of input ports and supplies them to the four sets of output ports. This switching is accomplished on the basis of information held by the network control information registers 21, 22, 32 and 42 on the input port side.

The port numbers held by the port number registers 14, 24, 34 and 44 are "1", "2", "3" and "4", respectively. These port numbers are entered as part of input data for the crossbar 50 for use as network control information when returning reply data.

The reference numerals in FIG. 3 are represented only by the final two digits for the convenience of explanation. Thus, for the network 2200 among the first stage networks for example, the port number register for the first input is represented by 2214, and the crossbar, by 2250.

Figure 4:
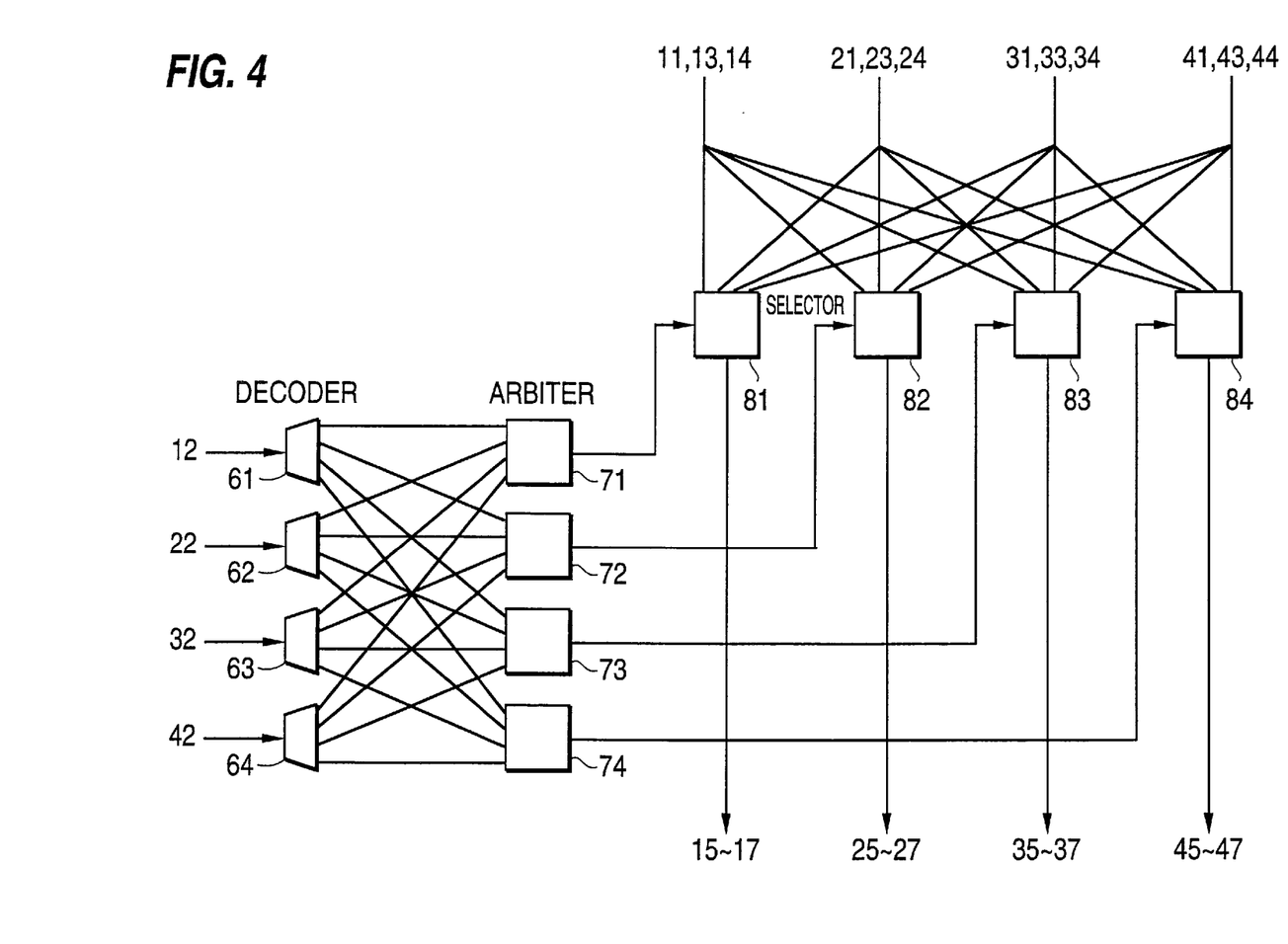
FIG. 4 is a block diagram of the crossbar in the first preferred embodiment of the invention.

Referring to FIGS. 3 and 4 together, for the packet 1900 entered, for instance, from the third input of the network 2200 among the first stage networks, the memory access request is held by the request register 2231. The control information for the first stage networks in this packet is held by the network control information register 2232, and that for the second stage networks, by the network control information register 2233. Therefore, the memory access request, the control information for the second network and the port number "3" are entered into the crossbar 2250. If the value of the control information register 2232 for the first stage networks is "4", said input will be supplied to the fourth output. Thus, the memory access request will be held by the request register 2245, the control information for the second stage networks, by the network control information register 2246, and the port number by the network control information register 2247 as control information for the fourth stage networks.

Referring now to FIG. 4, the crossbar 50 comprises decoders 61 to 64 for decoding network control information, arbiters 71 to 74 for arbitrating contention for each output, and selectors 81 to 84 for selecting and supplying one of the inputs. The decoders 61 to 64 enter information held in the network control information registers 12, 22, 32 and 42, respectively. Each of the decoders 61 to 64 activates only one of the four output signals according to said input signal, and conveys that active signal to one of the arbiters 71 to 74. Each of the arbiters 71 to 74, receiving the results of decoding from the decoders, selects one if signals from a plurality of decoders are active at the same time. A number of methods for this selection are well known to those skilled in the art, such as the fixed priority level system and the round-robin system, and any suitable one among them can be used. The arbiters 71 to 74, having selected one of the inputs, convey the result of selection to the respectively corresponding selectors 81 to 84, which, according to the result of selection from the arbiters 71 to 74, select and supply the designated input.

Whereas the foregoing description concerned the configurations of the first stage networks 2100 to 2400 and the second stage networks 3100 to 3400, the third stage networks 5100 to 5400 and the fourth stage networks 6100 to 6400 have substantially the same configurations, though they do not include port number registers 14, 24, 34 and 44 because there is no need for the addition of network control information.

Next will be described the operation of a parallel processing system according to the present invention with reference to the above-described first preferred embodiment.

Here is supposed a case in which the vector processor 1230 in the arithmetic processing unit 1200 reads out data from the memory module 4410 of the storage unit 4400.

Figure 5:
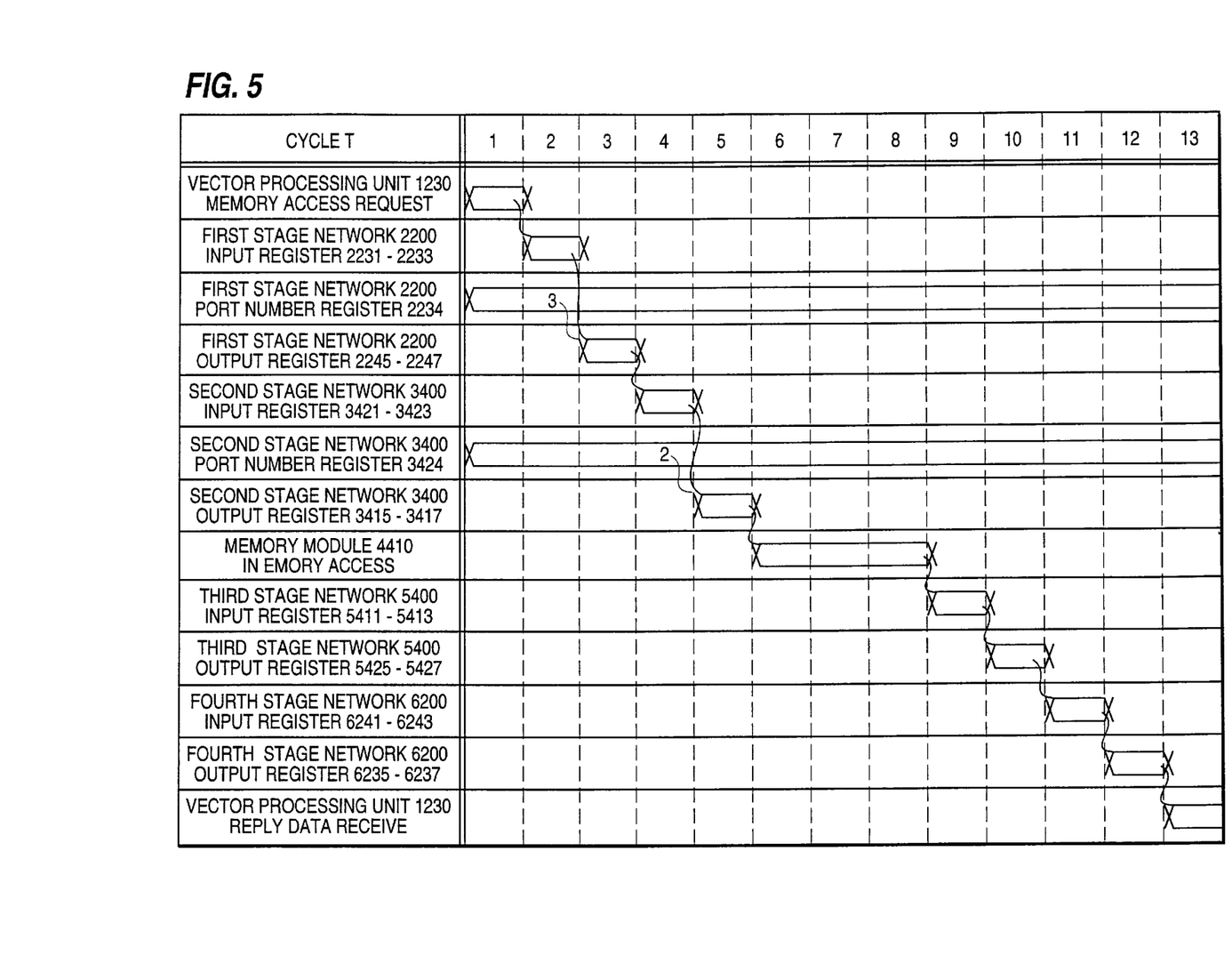
FIG. 5 shows a timing chart of operations in the system according to the invention.

Referring to FIGS. 1, 2 and 5 together, at time T=1, the vector processor 1230 issues a memory access request with the packet 1900. This request reaches the input registers 2231 to 2233 of the third input of the first stage network 2200 at time T=2. At this first stage network 2200, the value "3" of the port number register 2234 is added as the fourth stage network control information. Then this request is switched by the crossbar 2250 in the first stage networks on the basis of the first stage network control information, and reaches the output registers 2245 to 2247 of the fourth output at time T=3.

The data of these output registers 2245 to 2247 are transferred as the packet 2900, and reach the input registers 3421 to 3423 of the second input of the second stage network 3400 at time T=4. At this second stage network 3400, the value "2" of the port number register 3424 is added as the third stage network control information. Then this request is switched by the crossbar 3450 in the second stage networks on the basis of the second stage network control information, and reaches the output registers 3415 to 3417 of the first output at time T=5.

The data of these output registers 3415 to 3417 are transferred as the packet 3900, and reach the memory module 4410 of the storage unit 4400 at time T=6. This causes data to be read out from the designated address in the memory module 4410. The read out data are returned by the packet 4900 as reply data.

The reply data reach the input registers 5411 to 5413 of the first input of the third stage network 5400 at time T=9. The data of these input registers 5411 to 5413 are switched by the crossbar 5450 in the third stage networks on the basis of the third stage network control information, and reach the output registers 5425 to 5427 of the second output at time T=10.

The data of these output registers 5425 to 5427 are transferred as the packet 5900, and reach the input registers 6241 to 6243 of the fourth input of the fourth stage network 6200 at time T=11. The data of these input registers 6241 to 6243 are switched by the crossbar 6250 in the fourth stage networks on the basis of the fourth stage network control information, and reach the output registers 6235 to 6237 of the third output at time T=12.

The data of these output registers 5425 to 5427 are transferred as the packet 5900, and reach the input registers 6241 to 6243 of the fourth input of the fourth stage network 6200 at time T=11.

Then at time T=13, the reply data from these output registers 6235 to 6237 reach the vector processor 1230 to complete the memory access.

Thus, this parallel processing system, which is the first preferred embodiment of the present invention, is provided with port number registers for holding port numbers in each of its networks, and the port numbers are embedded into packets and transferred as network control information. This arrangement enables the networks to be controlled in accordance with this information when data are returned. Namely, by generating network control information for return in the networks which are passed before the memory is reached, the need to generate extra network control information in the arithmetic processing units 1100 to 1400 is eliminated, and the load of processing is accordingly reduced. Interface between the networks can also be simplified correspondingly.

Next will be described in detail another parallel processing system, which is a second preferred embodiment of the present invention, with reference to drawings.

Referring to FIGS. 1 and 2, the parallel processing system, which is the second embodiment of the invention, has a similar configuration to that of the above-described first embodiment, and its packet configuration also has a similar format to that of the first embodiment.

Figure 6:
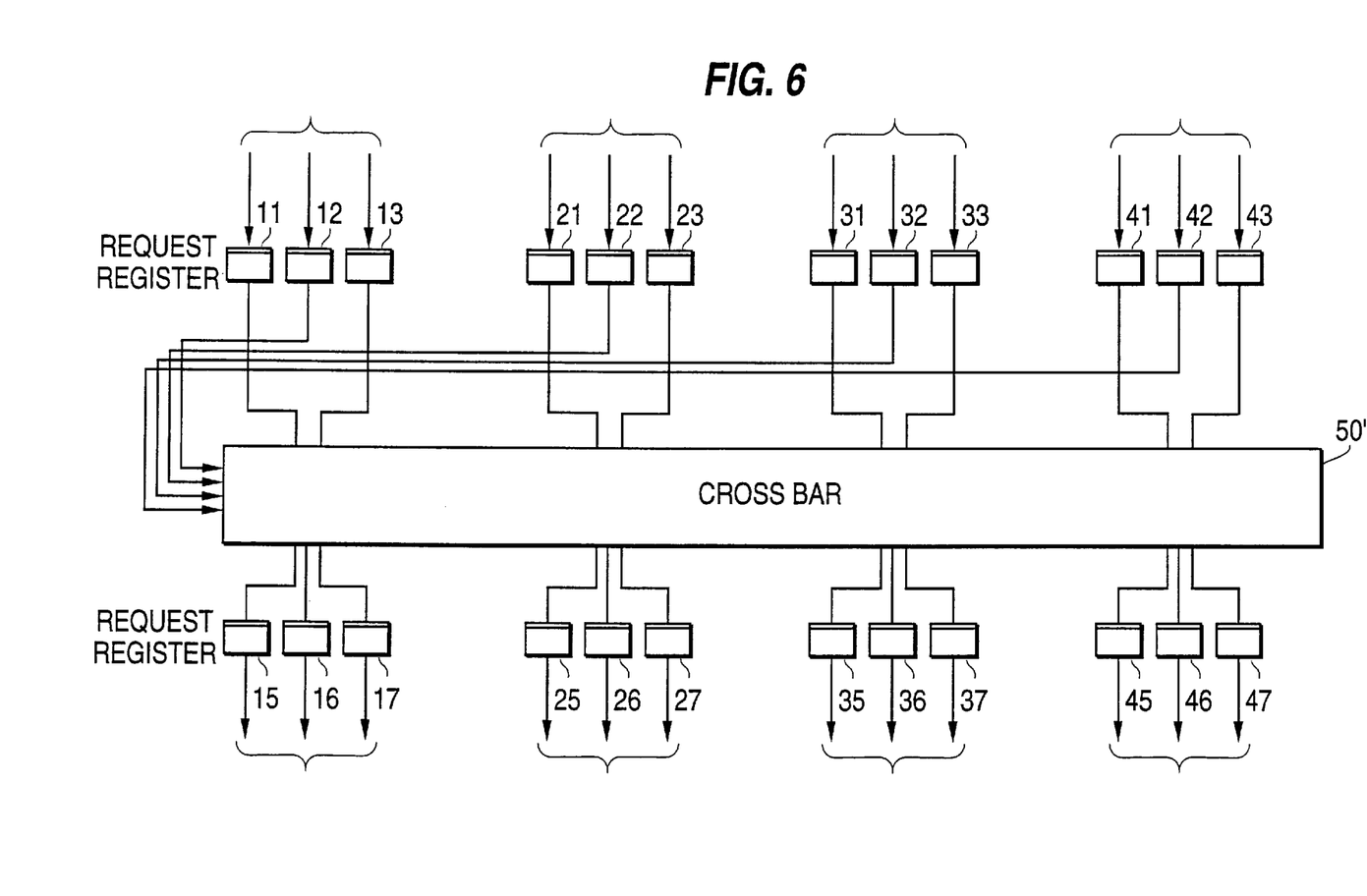
FIG. 6 is a block diagram of a first stage network in a second preferred embodiment of the invention.

Referring now to FIG. 6, each of the first stage or second stage networks in the second embodiment of the invention, like that in the first embodiment, has four sets each of input ports and output ports, constituting a 4×4 network through a crossbar 50'. On the input port side, there are provided request registers 11, 21, 31 and 41 for holding memory access requests and the like, and network control information registers 12, 13, 22, 23, 32, 33, 42 and 43 as in the first embodiment. The port number registers 14, 24, 34 and 44 provided in the first embodiment are absent in this second embodiment, because port numbers are generated in the crossbar 50' as will be described in more detail below.

On the output port side, there are provided request registers 15, 25, 35 and 45 for holding memory access requests and the like, and network control information registers 16, 17, 26, 27, 36, 37, 46 and 47 as in the first embodiment.

The reference numerals in FIG. 6 are represented, as in the case of the first embodiment, only by the final two digits for the convenience of explanation.

Figure 7:
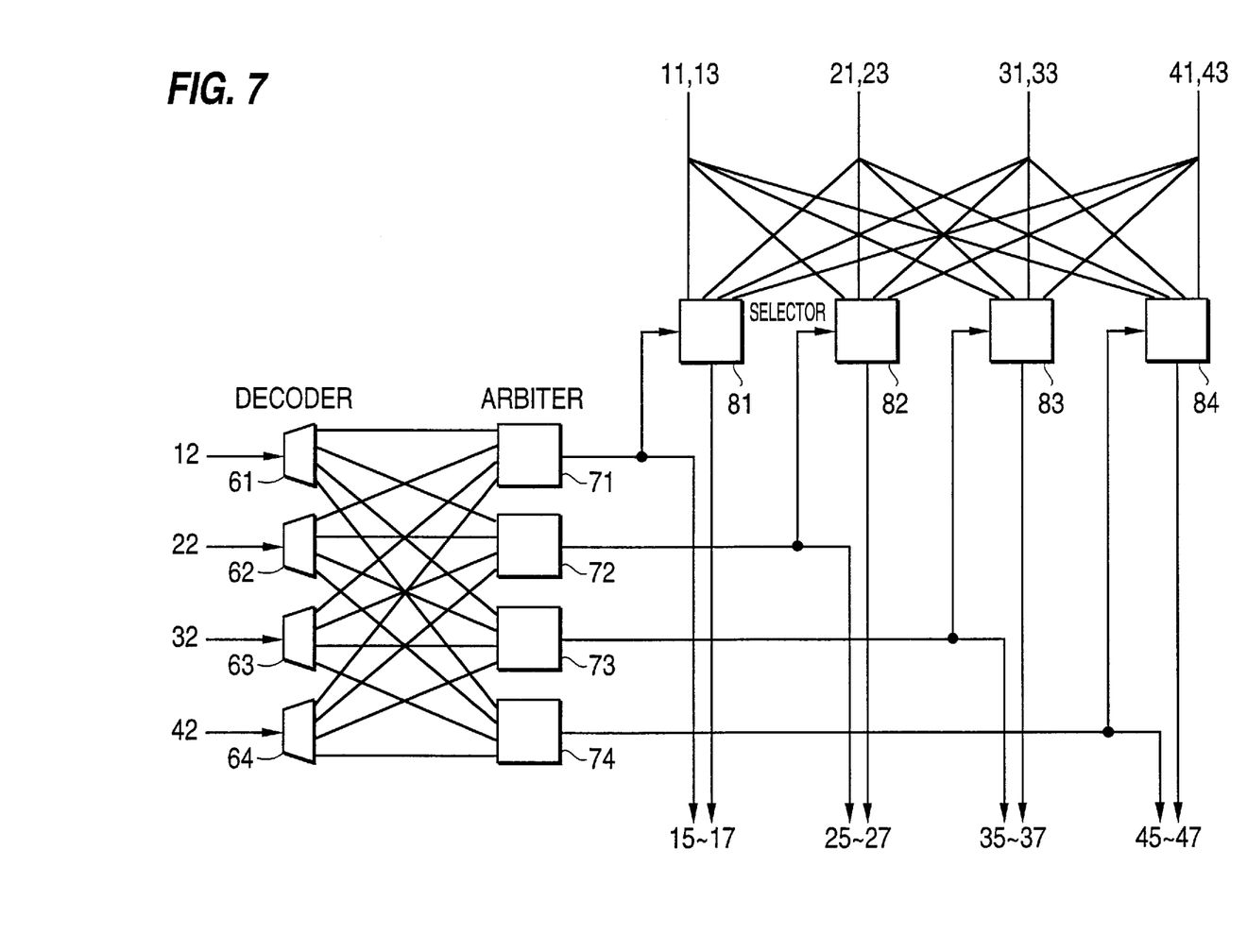
FIG. 7 is a block diagram of the crossbar in the second preferred embodiment of the invention.

Referring to FIG. 7, the crossbar 50' has basically the same configuration as the crossbar 50 in the first embodiment illustrated in FIG. 4. The difference from its counterpart in the first embodiment lies in that the outputs of arbiters 71 to 74 are supplied not only to selectors 81 to 84 but also directly to network control information registers 17, 27, 37 and 47. Thus the outputs of the arbiters 71 to 74 are signals for selection of the inputs to be supplied to the output registers, and exactly correspond to port numbers. Therefore, even though no port number is supplied to the crossbar, the same values as port numbers can be obtained by utilizing the outputs of the arbiters.

The networks in the second embodiment of the invention, as described above, differ in internal configuration from those in the first embodiment. However, the difference is whether port numbers are held by registers or generated in the cross bar, but the network functions are the same. Accordingly, there is no difference in operation as a parallel processing system between the first and second embodiments.

Thus, in this parallel processing system which is the second embodiment of the invention, port numbers are generated in the crossbar 50', and the port numbers are embedded into packets and transferred as network control information. This arrangement enables the networks to be controlled in accordance with this information when data are returned. Namely, like in the first embodiment, by generating network control information for return in the networks which are passed before the memory is reached, the need to generate extra network control information in the arithmetic processing units 1100 to 1400 is eliminated, and the load of processing is accordingly reduced. Interface between the networks can also be simplified correspondingly. Furthermore, since port numbers are generated in the crossbar 50', port number registers are dispensed with, and the bit widths of the selectors can be narrowed.

As hitherto described, the present invention provides the benefit to simplify interface between networks by generating in the networks, when memory access is to be accomplished in a parallel processing system, network control information for the return of read data and embedding it into requests.

What is claimed is:

1. A parallel processing system comprising:

a storage unit having a plurality of memory modules;

a plurality of arithmetic processing units for issuing read requests to said storage unit;

first data switching units for supplying in parallel the read requests from said plurality of arithmetic processing units to any of said memory modules in said storage unit; and second data switching units for supplying in parallel data read out from said storage unit to any of said arithmetic processing units via a plurality of output routes, wherein said first data switching units append to each of said read requests an identification of one of the plurality of output routes for use in said second data switching units.

2. A data switching circuit, comprising:

a plurality of input ports and a plurality of output ports, each input port having a corresponding port identifier, means for supplying in parallel a plurality of sets of input data to the output ports; and means for appending the port identifier of corresponding input port to each set of input data, and for supplying each set of input data to a different one of the output ports.

3. A data switching circuit, as claimed in claim 2, further comprising:

port identifier holding means for holding the port identifier of each input port, wherein the port identifiers held by the port identifier holding means are appended to said input data to identify correct output routes for output information.

4. A data switching circuit, as claimed in claim 2, further comprising:

arbitrating means for generating the port identifier corresponding to each input port, wherein the port identifiers generated by the arbitrating means are appended to said input data to identify correct output routes for output information.

5. A parallel processing system comprising:

a storage unit having a plurality of memory modules;

a plurality of arithmetic processing units for issuing read requests to said storage unit;

a plurality of first data switching circuits for transferring in parallel the read requests from said plurality of arithmetic processing units to said storage unit, each of said first data switching circuits including a plurality of input ports and a plurality of output ports, each input port having a corresponding port identifier, means for supplying in parallel a plurality of sets of input data to the output ports; and means for appending the port identifier of a corresponding input port to each set of input data, and for supplying each set of input data to a different one of the output ports; and a plurality of second data switching circuits for transferring in parallel data read out from said storage unit to said plurality of arithmetic processing units, each of said second data switching circuits being provided with a plurality of second input ports and a plurality of second output ports, one of said second output ports corresponding to each of said input ports of said first data switching circuits.

6. A parallel processing system comprising:

a plurality of arithmetic processing units, each containing a plurality of vector processors, each of the vector processors being connected to a corresponding input line and a corresponding output line;

a plurality of first stage networks connected to the output lines of the vector processors, each output line being connected to one of the first stage networks, the first stage networks receiving data read requests from the vector processors, the first stage networks forwarding each data read request to an appropriate one of a plurality of second stage networks based on information contained in the data read request while appending to the data read request first routing information identifying a corresponding first stage network;

a plurality of second stage networks receiving the data read requests from the first stage networks and forwarding each data read request while appending to the data read request second routing information identifying a corresponding second stage network;

a plurality of third stage networks corresponding in number to the plurality of second stage networks;

a plurality of fourth stage networks corresponding in number to the plurality of first stage networks; and a plurality of storage units receiving the data read requests from corresponding second stage networks, the storage units outputting reply packets in response to the read requests, each reply packet containing reply data, third stage network control information corresponding to the second routing information and fourth stage network control information corresponding to the first routing information, wherein each reply packet is routed to the vector processor which sent a corresponding data read request via specific ones of the third and fourth stage networks according to the third and fourth stage network control information contained in the reply packet.

* * * * *